US012712715B2

(12) United States Patent
Kim et al.

(10) Patent No.: US 12,712,715 B2
(45) Date of Patent: Aug. 18, 2026

(54) INFORMATION PROCESSING DEVICE, INFORMATION PROCESSING METHOD, COMPUTER PROGRAM PRODUCT, AND INFORMATION PROCESSING SYSTEM

(71) Applicant: KABUSHIKI KAISHA TOSHIBA, Tokyo (JP)

(72) Inventors: Suh Wuk Kim, Tokyo (JP); Yasuyuki Tanaka, Kawasaki (JP); Yoshimichi Tanizawa, Yokohama (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 95 days.

(21) Appl. No.: 18/732,912

(22) Filed: Jun. 4, 2024

(65) Prior Publication Data

US 2025/0070964 A1 Feb. 27, 2025

(30) Foreign Application Priority Data

Aug. 25, 2023 (JP) ................................ 2023-137045

(51) Int. Cl.
*H04L 9/08* (2006.01)

(52) U.S. Cl.
CPC .................................. *H04L 9/0852* (2013.01)

(58) Field of Classification Search
CPC ........................... H04L 9/0852; H04L 9/0855
See application file for complete search history.

(56) References Cited

U.S. PATENT DOCUMENTS 5,394,116 A 2/1995 Kasturia
2007/0016794 A1* 1/2007 Harrison ............... H04L 9/0656 713/182

(Continued)

FOREIGN PATENT DOCUMENTS

EP 0 822 683 A2 2/1998
JP 2014-103503 A 6/2014

(Continued)

OTHER PUBLICATIONS

IETF, "RFC9110: HTTP Semantics," 163 pages (2022).

(Continued)

*Primary Examiner* — Michael R Vaughan
*Assistant Examiner* — Abdulllah Almamun
(74) *Attorney, Agent, or Firm* — Finnegan, Henderson, Farabow, Garrett & Dunner, LLP

(57) ABSTRACT

An information processing device is connected to at least a first communication device. The information processing device includes a processor. The first communication device acquires, from a first key management device, an encryption key shared between the first key management device and a second key management device. A second communication device acquires the encryption key from the second key management device. The processor acquires first attribute information indicating an attribute of the encryption key from the first communication device or from a message transmitted and received through communication. The processor acquires second attribute information indicating an attribute of the encryption key on the basis of the information acquired from the first key management device. The processor outputs information related to the first attribute information and the second attribute information.

20 Claims, 5 Drawing Sheets

(56) References Cited

U.S. PATENT DOCUMENTS

| | | | | |
|---|---|---|---|---|
| 2014/0143867 | A1 | 5/2014 | Tanizawa et al. | |
| 2014/0331050 | A1* | 11/2014 | Armstrong | H04L 9/0855 380/278 |
| 2015/0036825 | A1 | 2/2015 | Tanizawa et al. | |
| 2018/0269989 | A1* | 9/2018 | Murakami | H04J 14/0227 |
| 2022/0294617 | A1* | 9/2022 | Parry | H04L 9/0855 |
| 2024/0313950 | A1 | 9/2024 | Tanaka et al. | |
| 2024/0340170 | A1* | 10/2024 | Lee | H04L 9/0855 |

FOREIGN PATENT DOCUMENTS

| | | | |
|---|---|---|---|
| JP | 2015-32962 | A | 2/2015 |
| KR | 10-2022-0049197 | A | 4/2022 |
| WO | WO 2022264373 | A1 | 12/2022 |

OTHER PUBLICATIONS

ETSI, "ETSI GS QKD 014 V1.1.1 (Feb. 2019): Quantum Key Distribution (QKD); Protocol and data format of REST-based key delivery API," 22 pages (2019).

Telecommunication Standardization Sector of ITU, "Recommendation ITU-T Y.3800 (2019)—Corrigendum 1 (Overview on networks supporting quantum key distribution)," https://www.itu.int/rec/T-REC-Y.3800-201910-I/en, 22 pages (2020).

European Patent Office, Extended European Search Report in EP App. No. 24180902.9, 9 pages (Nov. 28, 2024).

Japan Patent Office, Office Action in JP App. No. 2023-137045 (Feb. 3, 2026).

* cited by examiner

| SAE ID | KEY ID |
|---|---|
| T0001 | K00011 |
| T0002 | K00021 |
| T0002 | K00022 |
| ⋮ | ⋮ |
| T0003 | K00031 |
| ⋮ | ⋮ |

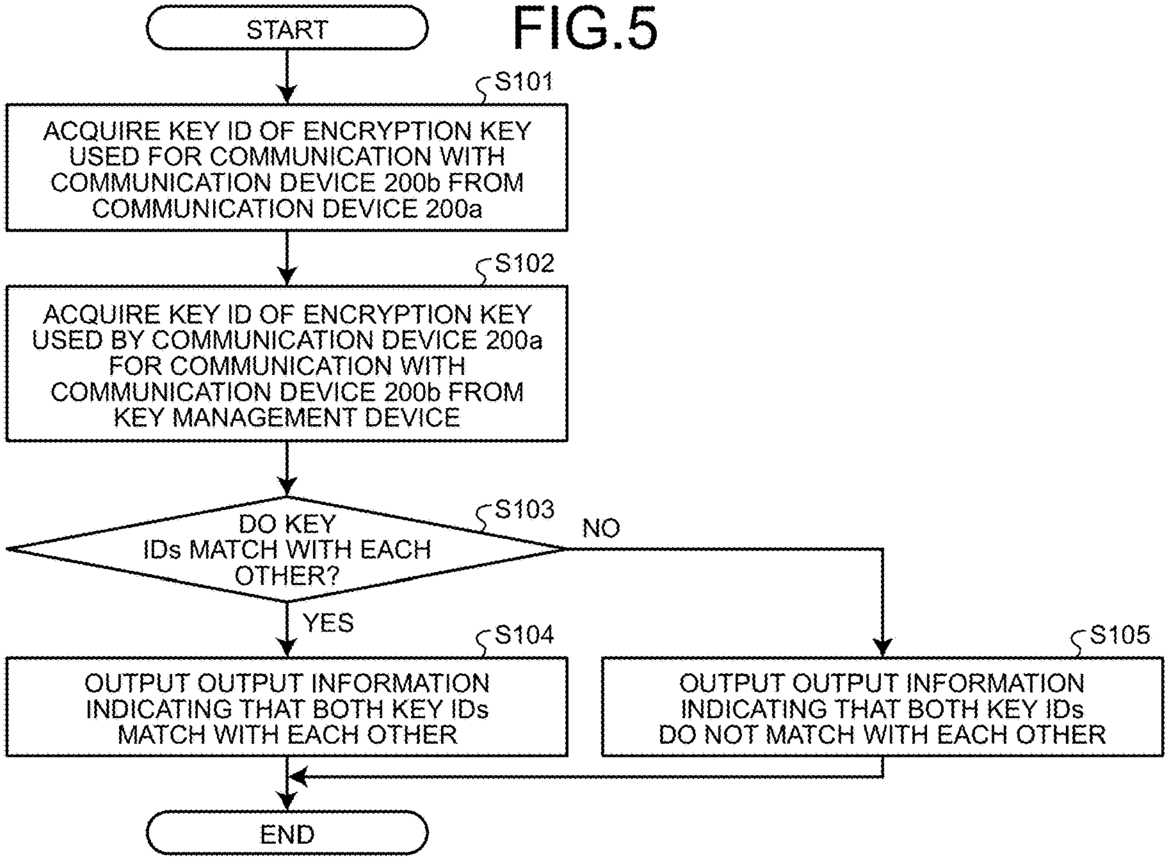

FIG.5
START
S101
ACQUIRE KEY ID OF ENCRYPTION KEY USED FOR COMMUNICATION WITH COMMUNICATION DEVICE 200b FROM COMMUNICATION DEVICE 200a
S102
ACQUIRE KEY ID OF ENCRYPTION KEY USED BY COMMUNICATION DEVICE 200a FOR COMMUNICATION WITH COMMUNICATION DEVICE 200b FROM KEY MANAGEMENT DEVICE
S103
DO KEY IDs MATCH WITH EACH OTHER?
NO
YES
S104
OUTPUT OUTPUT INFORMATION INDICATING THAT BOTH KEY IDs MATCH WITH EACH OTHER
S105
OUTPUT OUTPUT INFORMATION INDICATING THAT BOTH KEY IDs DO NOT MATCH WITH EACH OTHER
END

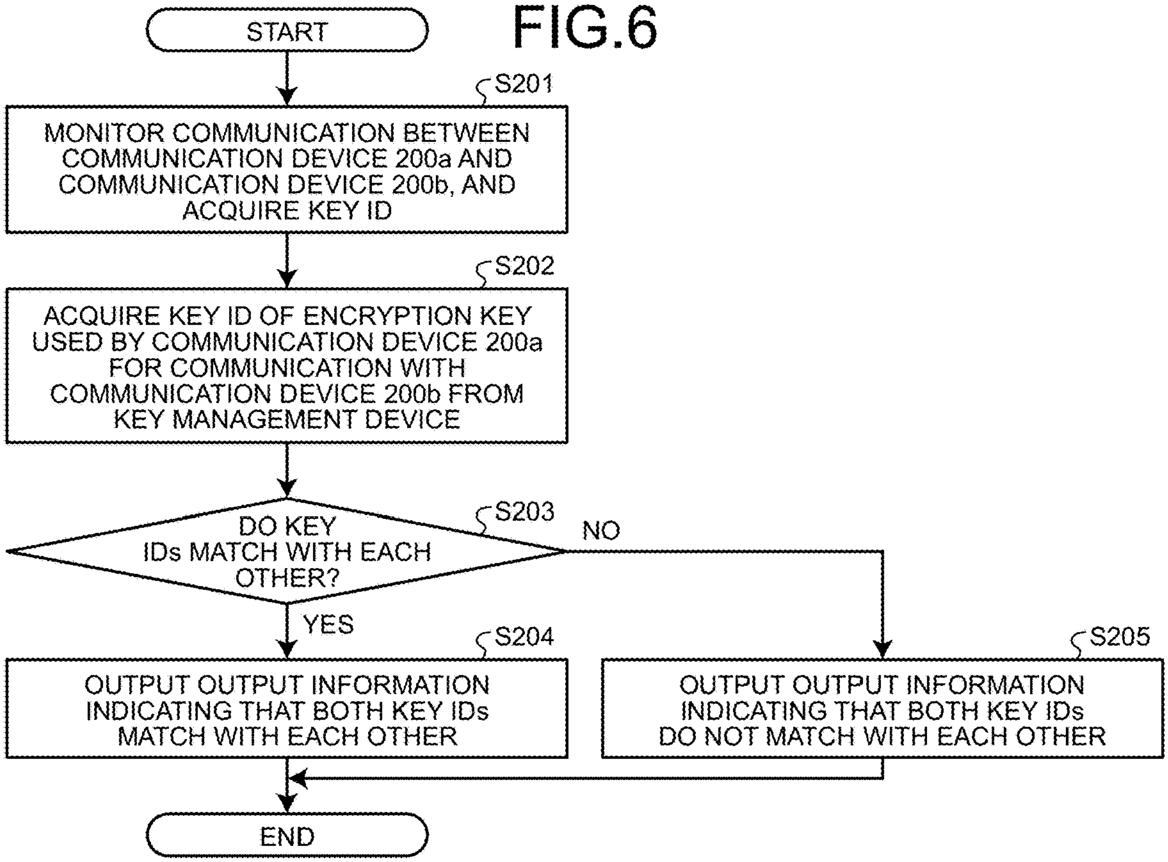

FIG.6
START
S201
MONITOR COMMUNICATION BETWEEN COMMUNICATION DEVICE 200a AND COMMUNICATION DEVICE 200b, AND ACQUIRE KEY ID
S202
ACQUIRE KEY ID OF ENCRYPTION KEY USED BY COMMUNICATION DEVICE 200a FOR COMMUNICATION WITH COMMUNICATION DEVICE 200b FROM KEY MANAGEMENT DEVICE
S203
DO KEY IDs MATCH WITH EACH OTHER?
NO
YES
S204
OUTPUT OUTPUT INFORMATION INDICATING THAT BOTH KEY IDs MATCH WITH EACH OTHER
S205
OUTPUT OUTPUT INFORMATION INDICATING THAT BOTH KEY IDs DO NOT MATCH WITH EACH OTHER
END

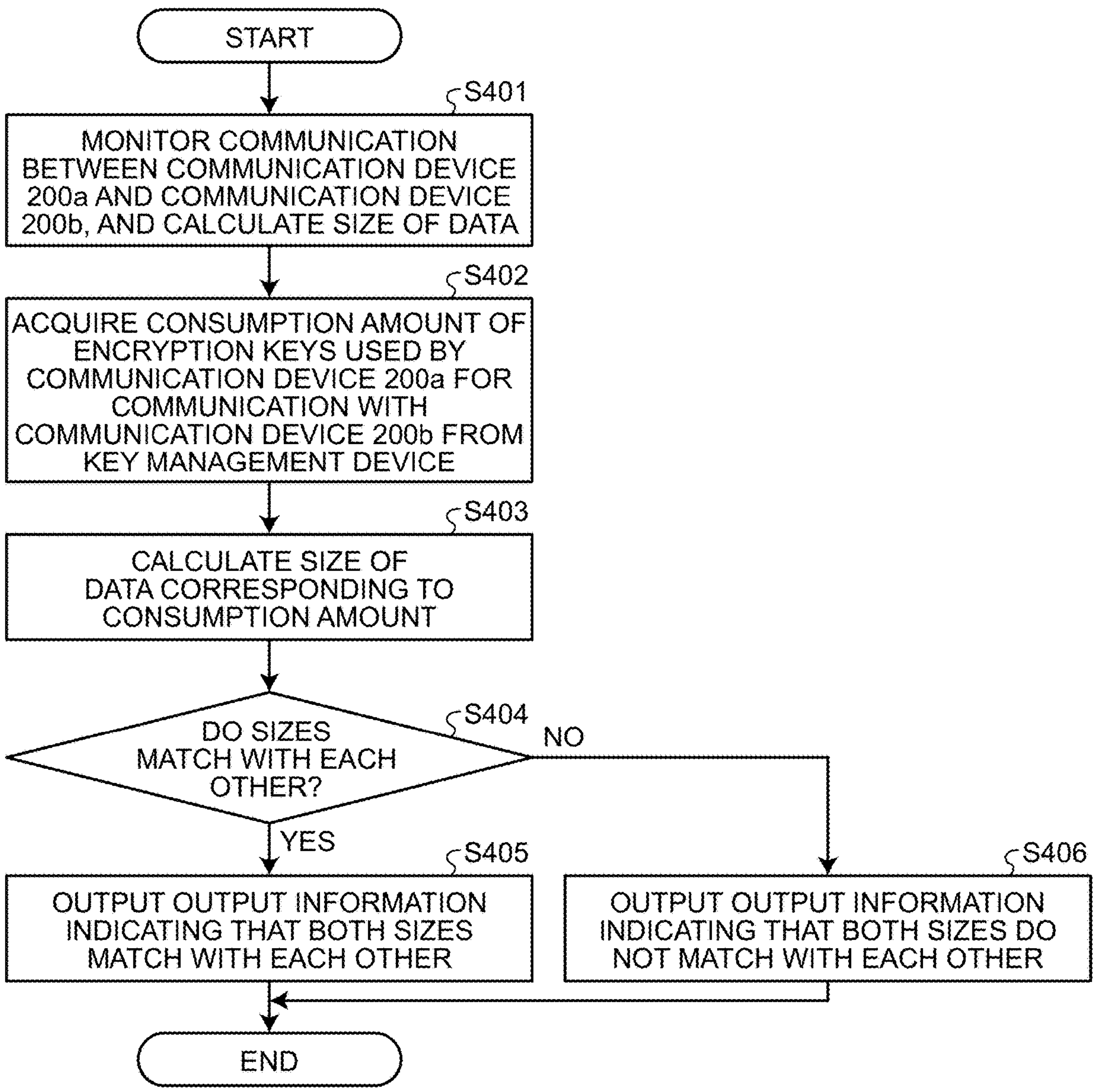

FIG.8

START

S401
MONITOR COMMUNICATION BETWEEN COMMUNICATION DEVICE 200a AND COMMUNICATION DEVICE 200b, AND CALCULATE SIZE OF DATA

S402
ACQUIRE CONSUMPTION AMOUNT OF ENCRYPTION KEYS USED BY COMMUNICATION DEVICE 200a FOR COMMUNICATION WITH COMMUNICATION DEVICE 200b FROM KEY MANAGEMENT DEVICE

S403
CALCULATE SIZE OF DATA CORRESPONDING TO CONSUMPTION AMOUNT

S404
DO SIZES MATCH WITH EACH OTHER?

NO

YES

S405
OUTPUT OUTPUT INFORMATION INDICATING THAT BOTH SIZES MATCH WITH EACH OTHER

S406
OUTPUT OUTPUT INFORMATION INDICATING THAT BOTH SIZES DO NOT MATCH WITH EACH OTHER

END

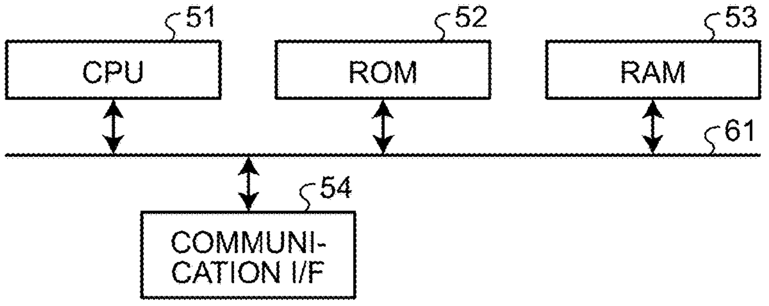

FIG.9

INFORMATION PROCESSING DEVICE, INFORMATION PROCESSING METHOD, COMPUTER PROGRAM PRODUCT, AND INFORMATION PROCESSING SYSTEM

CROSS-REFERENCE TO RELATED APPLICATIONS

This application is based upon and claims the benefit of priority from Japanese Patent Application No. 2023-137045, filed on Aug. 25, 2023; the entire contents of which are incorporated herein by reference.

FIELD

Embodiments of the present disclosure relate generally to an information processing device, an information processing method, a computer program product, and an information processing system.

BACKGROUND

Quantum key distribution (hereinafter, QKD) is a technique for securely sharing an encryption key between a QKD device that continuously transmits a single photon and another QKD device that receives the single photon. The QKD devices are connected by an optical fiber link. An encryption key shared by means of the QKD is guaranteed not to be eavesdropped based on the principle of quantum mechanics.

It is guaranteed by information theory that data subjected to encryption data communication using an encryption communication method called one time pad (OTP) using a shared encryption key cannot be decrypted by eavesdroppers having any knowledge.

BRIEF DESCRIPTION OF THE DRAWINGS

FIG. 5 is a flowchart of state confirmation processing in the embodiment;

FIG. 6 is a flowchart of state confirmation processing in Variation 1;

FIG. 8 is a flowchart of state confirmation processing in Variation 3; and

FIG. 9 is a hardware configuration diagram of a device of the embodiment.

DETAILED DESCRIPTION

An information processing device according to an embodiment is connected to at least a first communication device out of the first communication device and a second communication device. The first communication device acquires, from a first key management device, an encryption key shared by quantum key distribution between the first key management device and a second key management device.

The encryption key is to be used for communication with the second communication device. The second communication device acquires the encryption key to be used for communication with the first communication device from the second key management device. The information processing device includes one or more hardware processors. The one or more hardware processors are configured to acquire first attribute information indicating an attribute of the encryption key to be used for communication between the first communication device and the second communication device. The first attribute information is acquired from the first communication device or from a message transmitted and received in communication between the first communication device and the second communication device. The one or more hardware processors are configured to acquire second attribute information indicating an attribute of the encryption key to be used for communication between the first communication device and the second communication device. The second attribute information is acquired on the basis of information acquired from the first key management device. The one or more hardware processors are configured to output information related to the first attribute information and the second attribute information.

A preferred embodiment of an information processing device according to the present disclosure will be described in detail below with reference to the accompanying drawings.

Figure 1:
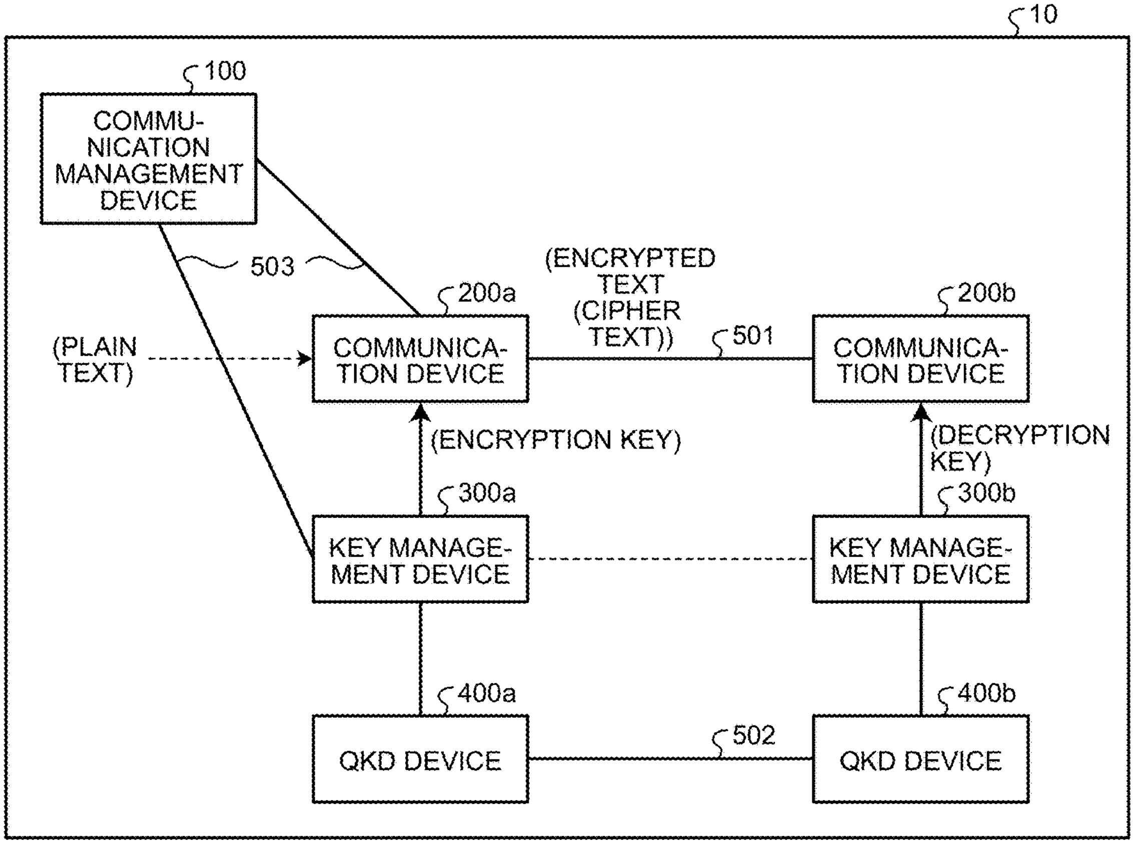
FIG. 1 is a block diagram of an information processing system according to an embodiment.

FIG. 1 is a block diagram illustrating one example of a configuration of an information processing system according to the embodiment. As illustrated in FIG. 1, an information processing system 10 of the embodiment includes a communication management device 100 serving as an information processing device, communication devices 200*a* and 200*b*, key management devices 300*a* and 300*b*, and QKD devices 400*a* and 400*b*.

Since the communication devices 200*a* and 200*b* have similar configurations, each may be simply referred to as a communication device 200 when it is not necessary to distinguish them. Similarly, the key management devices 300*a* and 300*b* may each be simply referred to as a key management device 300. The QKD devices 400*a* and 400*b* may each be simply referred to as a QKD device 400.

While FIG. 1 illustrates two communication devices 200, two key management devices 300, and two QKD devices 400, the information processing system 10 may include three or more communication devices 200, three or more key management devices 300, and three or more QKD devices 400.

The communication devices 200*a* and 200*b* are connected by a network 501 to perform communication over the network 501. The QKD devices 400*a* and 400*b* are connected by a network 502. The communication management device 100 and the communication device 200*a* and the key management device 300*a* are connected by a network 503.

Any form of network may be used as the network 501. For example, the network 501 is a local network such as a local area network (LAN), or a wider range of network such as a wide area network (WAN). The network 501 may be a wireless communication network such as the fifth-generation mobile communication system (5G).

The network 502 is, for example, an optical fiber link. The network 502 is used for the QKD device 400*a* and the QKD device 400*b* to share an encryption key created by means of the QKD.

Any form of network may be used as the network 503. The network 503 is, for example, a LAN or a WAN. The network 503 may be integrated with the network 501.

The communication management device 100 manages at least communication performed by the communication device 200*a*. A QKD device 400 shares an encryption key with another QKD device 400 by means of the QKD. A key management device 300 manages an encryption key shared by the QKD devices 400. In one example, the key management device 300*a* manages an encryption key that is shared by the QKD device 400*a* with the QKD device 400*b*. The key management device 300*b* manages an encryption key shared by the QKD device 400*b* with the QKD device 400*a*. Such a configuration enables the key management device 300*a* to share and manage the same encryption key with the key management device 300*b* connected to the QKD device 400*b*. A dotted line in FIG. 1 indicates that the key management device 300*a* and the key management device 300*b* have a relationship described above.

Figure 2:
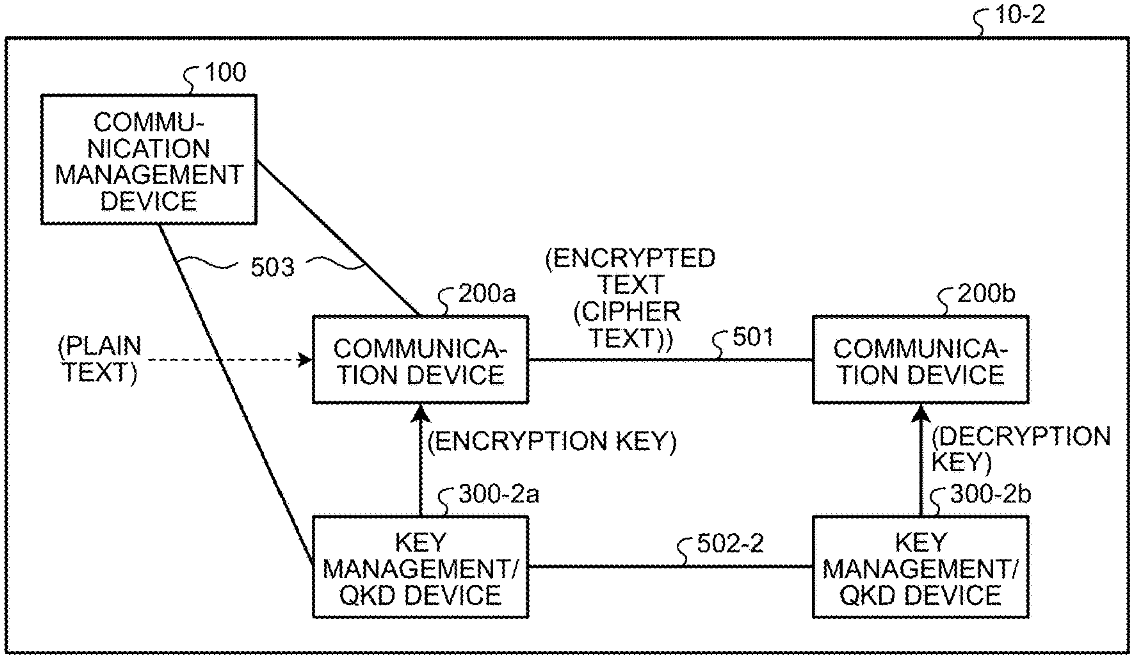
FIG. 2 is a block diagram illustrating another configuration example of the information processing system.

Note that the key management device 300 and the QKD device 400 may be integrated into a single device, as shown in FIG. 2. FIG. 2 is a block diagram illustrating one example of a configuration of an information processing system 10-2 in which the key management device 300 and the QKD device 400 in FIG. 1 are integrated into a single device.

As illustrated in FIG. 2, the information processing system 10-2 includes the communication management device 100, the communication devices 200*a* and 200*b*, and key management/QKD devices 300-2*a* and 300-2*b*. The key management/QKD devices 300-2*a* and 300-2*b* may be simply referred to as key management/QKD devices 300-2 when it is not necessary to distinguish them. A key management/QKD device 300-2 is equivalent to a device having both functions of the key management device 300 and the QKD device 400 in FIG. 1. The key management/QKD devices 300-2 are connected by a network 502-2. The network 502-2 is, for example, an optical fiber link.

Returning to FIG. 1, each communication device 200 acquires an encryption key to be used for communication, from the corresponding key management device 300 to which each communication device 200 is connected. In one example, the communication device 200*a* (an example of the first communication device) acquires, from the key management device 300*a*, an encryption key (or decryption key), which is shared by the QKD between the key management device 300*a* (an example of the first key management device) and the key management device 300*b* (an example of the second key management device) and is to be used for communication with the communication device 200*b*. The communication device 200*b* (an example of the second communication device) acquires an encryption key to be used for communication with the communication device 200*a*, from the key management device 300*b*.

While FIG. 1 (also FIG. 2) illustrates one communication management device 100, the information processing system 10 includes two or more communication management devices 100. In one example, when the communication device 200*a* and the communication device 200*b* are provided in different bases (places), one communication device 200 may be provided for each base. The communication management device 100 in each base may be connected to one or more communication devices 200 and one or more key management devices 300 installed in the base. Alternatively, one communication management device 100 may be connected to two or more communication devices 200 installed in plural bases and may manage communication in each base.

Moreover, the communication management device 100 may be incorporated in the key management device 300*a*. In other words, the communication management device 100 may have a function to serve as the key management device 300*a*.

A case where the communication management device 100 is connected to the communication device 200*a* and manages quantum encryption communication through the communication device 200*a* will be described below.

It is assumed that data is transmitted via the network 501 in a direction from the communication device 200*a* toward the communication device 200*b* or a direction opposite thereto. The communication device 200*a* transmits, to the communication device 200*b* via the network 501, encrypted text (cipher text) created by encrypting plain text with an encryption key acquired from the key management device 300*a*. In such a situation, in order to perform secure communication between the communication devices 200*a* and 200*b*, mutual authentication, encryption of data to be transmitted and received, confirmation of validity of data, and the like are executed.

The present embodiment mainly relates to encryption of data among the functions above. In a conventional technique such as hypertext transfer protocol secure (HTTPS), a common key encryption method is applied to data itself, which is to be transmitted and received, while a public key encryption method is used for sharing a common key. The common key encryption method is based on computational security. If a technique with much higher computational speed than current computational speed, such as a quantum computer, is commercialized, the security cannot be secured. This is referred to as computational security.

In contrast, an OTP encryption method is used as an encryption method that is based on information theoretical security. In the OTP, encryption and decryption are performed on data of one bit by using an encryption key of one bit. As long as an encryption key is correctly created and the encryption key is not leaked, the encryption key is not decrypted even by a high-speed computer such as a quantum computer.

In that case, a challenge is securely sharing the encryption key. In other words, both who perform communication need to share in advance the encryption key without eavesdropping of another person. The QKD is used for solving such a challenge.

In the QKD, an encryption key is shared among two or more QKD devices 400 through an optical fiber link. In this case, if the encryption key is eavesdropped by a third party in the middle of the optical fiber link, the eavesdropping can be detected, and the encryption key can be discarded. This enables the geographically separated QKD devices 400 to share an encryption key that has not been discarded, namely, an encryption key that has not been eavesdropped.

A technique of performing secure communication under the information theoretical security by combining the OTP and the QKD is referred to as quantum encryption communication. In order to implement secure communication by the quantum encryption communication, the communication device 200*a* acquires, from the key management device 300*a*, an encryption key that is shared in advance by means of the QKD between the key management device 300*b* connected to the communication device 200*b* and the key management device 300*a* connected to the communication device 200*a* itself. The communication device 200*a* encrypts data by using the encryption key acquired from the key management device 300*a*, and transmits the encrypted data to the communication device 200*b*. The communication device 200*b* decrypts the encrypted data by using the encryption key acquired from the key management device 300*b*. Thereby, the quantum encryption communication can be performed.

From the viewpoint of a user who uses the quantum encryption communication, it is desirable to enable the user to recognize whether the quantum encryption communication is currently available. In conventional encryption communication other than the quantum encryption communication, a technique for confirming a state such as whether encryption communication is available has been known. For example, there is a technique of displaying, in communication using a web browser, a key mark on the web browser when encryption communication is executed and not displaying the key mark on the web browser when the encryption communication is not executed.

In contrast, in the quantum encryption communication, a technique enabling confirmation of the state of the quantum encryption communication is not known. The quantum encryption communication is assumed to be used for transmission and reception of more important data (e.g., genome data). Therefore, it is desirable that the user can confirm whether data can be securely transmitted and received. For example, it is desirable that the user can share the encryption key by using the QKD between a communication device (e.g., the communication device 200*a*) used by the user himself/herself and a destination communication device (e.g., the communication device 200*b*). Then, it is desirable that data is transmitted when the user can successfully confirm that the data to be transmitted (uploaded) to the destination communication device can be encrypted with the shared encryption key.

Therefore, in the present embodiment, a technique of confirming the state of the quantum encryption communication is implemented. Note that the state of the quantum encryption communication may be confirmed not only for confirming whether communication is secure as described above but also for any other purpose. In one example, a consumption amount of encryption keys may be confirmed as the state of the quantum encryption communication in order to collect a fee in accordance with the consumption amount (usage amount).

Figures 3, 4:
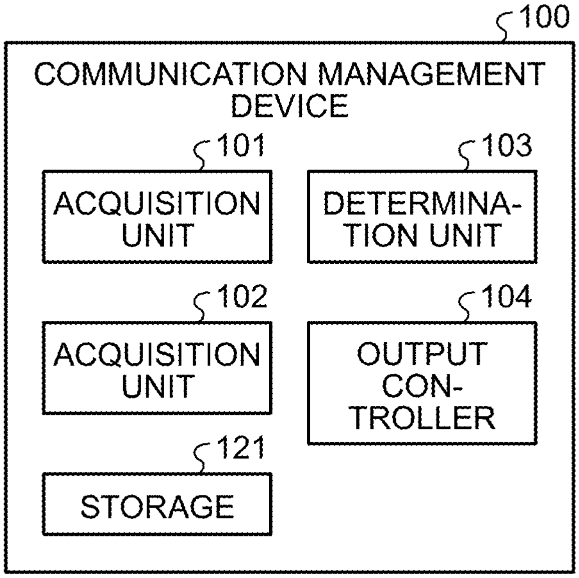
FIG. 3 is a block diagram of a communication management device.
FIG. 4 illustrates one example of a data structure of management information managed by a key management device.

For implementing such a technique above, the information processing system 10 of the embodiment includes the communication management device 100. FIG. 3 is a block diagram illustrating one example of a configuration of the communication management device 100. As illustrated in FIG. 3, the communication management device 100 includes an acquisition unit 101 (first acquisition unit), an acquisition unit 102 (second acquisition unit), a determination unit 103, an output controller 104, and a storage 121.

The acquisition unit 101 acquires, from the communication device 200*a*, attribute information IA (an example of the first attribute information) indicating an attribute of an encryption key to be used for communication between the communication device 200*a* and the communication device 200*b* that serves as a communication destination for the communication device 200*a*. The attribute may include any information. Examples of the attribute include key identification information (hereinafter, a key ID) by which an encryption key is identified.

In one example, the acquisition unit 101 requests the communication device 200*a* to transmit a key ID of an encryption key to be used for the next quantum encryption communication. The communication device 200*a* stores and manages information about the encryption key to be used for the next quantum encryption communication in a storage of the communication device 200*a* itself. The communication device 200*a* transmits the key ID to the acquisition unit 101 in response to the request. The acquisition unit 101 acquires the key ID transmitted by the communication device 200*a*.

The acquisition unit 102 acquires attribute information IB (an example of the second attribute information) indicating the attribute of the encryption key to be used for communication between the communication device 200*a* and the communication device 200*b*, on the basis of the information acquired from the key management device 300*a*. In the present embodiment, the acquisition unit 102 acquires the attribute information IB from the key management device 300*a*. In one example, the acquisition unit 102 transmits, to the key management device 300*a*, device identification information for identifying the communication device 200*b* serving as a communication destination, and acquires, as the attribute information IB, the key ID that is transmitted by the key management device 300*a* in response to the device identification information.

In one example, the key management device 300*a* stores and manages the information about the encryption key to be used for the next quantum encryption communication, in a storage in the key management device 300*a* itself for each communication device 200. FIG. 4 illustrates one example of a data structure of management information managed by the key management device 300*a*. As illustrated in FIG. 4, the management information is information in which a secure application entity ID (SAE ID) being the device identification information is correlated with a key ID. The SAE is an element that requests a key from the key management device 300 as defined in a literature, for example, ETSI GS QKD 014 V1.1.1, "Quantum Key Distribution (QKD); Protocol and data format of REST-based key delivery API", Section 6.1 Status data format, (2019-02), and corresponds to the communication device 200 in the embodiment. One SAE ID may be correlated with one key ID or with two or more key IDs.

The key management device 300*a* identifies a key ID corresponding to the device identification information (SAE ID) transmitted from the acquisition unit 102 by referring to the management information as illustrated in FIG. 4. Then, the management device 300*a* transmits the identified key ID to the acquisition unit 102 of the communication management device 100.

The determination unit 103 determines whether an attribute that is indicated by the attribute information IA acquired by the acquisition unit 101 matches with an attribute that is indicated by the attribute information IB acquired by the acquisition unit 102. In one example, the determination unit 103 determines whether a key ID acquired as the attribute information IA matches with a key ID acquired as the attribute information IB. The state where the key IDs match with each other means that an encryption key managed by the communication device 200*a* matches with an encryption key managed by the key management device 300*a*. Therefore, such a state can be interpreted as a normal state of the quantum encryption communication. The determination unit 103 may output, as a determination result, information representing whether pieces of attribute information such as the key IDs match with each other. Alternatively, the determination unit 103 may output, as a determination result, information indicating the state (e.g., normal or abnormal state) of the quantum encryption communication.

Note that, when some abnormality occurs in the quantum encryption communication, the pieces of attribute information may fail to match with each other. Examples of such a situation include a situation that an encryption key is managed by the communication device 200*a* as being within a valid period, whereas the encryption key is managed by the key management device 300*a* as being out of the valid period.

The output controller 104 controls output of various pieces of information used by the communication management device 100. In one example, the output controller 104 outputs information related to the attribute information IA and the attribute information IB. The output information may be in any format. In one example, the output information indicates a determination result from the determination unit 103. This enables a device of an output destination to execute processing in accordance with the determination result. Any processing serves as the processing in accordance with the determination result. In one example, when a determination result represents that the attribute indicated by the attribute information IA matches with the attribute indicated by the attribute information IB, information (e.g., a key mark) indicating that the quantum encryption communication is being executed is output in the processing.

The output controller 104 may output information including the attribute information IA and the attribute information IB. By outputting such output information enables the device of an output destination to confirm the state of the quantum encryption communication by using the output information. Such a configuration can be interpreted as confirming (determining) the state of the quantum encryption communication by using the device of an output destination. In this configuration, the communication management device 100 is not required to include the determination unit 103.

At least part of the above-described units (acquisition unit 101, acquisition unit 102, determination unit 103, and output controller 104) may be implemented by one or more processing units. In one example, the above-described units are implemented by one or more hardware processors. Alternatively, the above-described units may be implemented by causing one or more processors such as a central processing unit (CPU) and a graphics processing unit (GPU) to execute a computer program, namely, implemented by software. The above-described units may be implemented by a processor such as a dedicated integrated circuit (IC), namely, implemented by hardware. The above-described units may be implemented by using software and hardware in combination. When two or more processors are used, each processor may implement one of the units or two or more of the units.

The storage 121 stores various pieces of information used by the communication management device 100. In one example, the storage 121 stores the attribute information IA and attribute information IB, which have been acquired, and a determination result of the determination unit 103. Note that the storage 121 can include all commonly used storage media such as a flash memory, a memory card, a random access memory (RAM), a hard disk drive (HDD), and an optical disk.

The communication management device 100 may be physically configured by one device, or two or more devices. The communication management device 100 may be provided in a cloud environment.

When provided in the cloud environment, the communication management device 100 may be configured to acquire the attribute information IA and IB via a data collection function provided in a network of the same base as that of the communication device 200*a*.

Next, state confirmation processing performed by the communication management device 100 according to the embodiment will be described. Note that, in the state confirmation processing, the state of the quantum encryption communication used by the communication device 200 is confirmed. The state confirmation processing may be executed at any timing. The state confirmation processing can be executed in any of the following modes.

The state confirmation processing is executed when a user gives an instruction for execution.

The state confirmation processing is executed when a function (e.g., application) of executing the quantum encryption communication is started. In one example, in a case of an application that transmits data by using a web browser, the state confirmation processing is executed when a specific page used for transmitting data is displayed.

The state confirmation processing is executed at regular intervals (periodically). The communication management device 100 may manage the regular intervals, or an external device may manage the regular intervals. In the latter case, the external device may instruct the communication management device 100 to execute the state confirmation processing at regular time intervals.

FIG. 5 is a flowchart illustrating one example of the state confirmation processing in the embodiment. A case where the communication device 200*a* executes the quantum encryption communication with the communication device 200*b* will be described below as an example.

The acquisition unit 101 acquires, from the communication device 200*a*, a key ID of an encryption key to be used for communication with the communication device 200*b* (Step S101). In one example of a procedure for acquiring the key ID, the acquisition unit 101 gives, to the communication device 200*a*, device identification information (SAE ID) of the communication device 200*b* serving as a communication destination. The communication device 200*a* transmits, to the communication management device 100, the key ID of the encryption key to be used for communication with the communication device 200*b*. This procedure enables the acquisition unit 101 to acquire the key ID from the communication device 200*a*. The acquired key ID is equivalent to the attribute information IA.

The acquisition unit 102 acquires, from the key management device 300*a*, a key ID of an encryption key to be used by the communication device 200*a* for communication with the communication device 200*b* (Step S102). In one example of a procedure for acquiring the key ID, the acquisition unit 102 of the communication management device 100 gives the device identification information (SAE ID) of the communication device 200*b* to the key management device 300*a*. In response, the key management device 300*a* transmits, to the communication management device 100, a key ID of an encryption key that has been given to the communication device 200*a* for communication with the communication device 200*b*. This procedure enables the acquisition unit 102 to acquire the key ID from the key management device 300*a*. The acquired key ID in this procedure is equivalent to the attribute information IB.

The determination unit 103 compares the key ID acquired in Step S101 with the key ID acquired in Step S102 and determines whether those key IDs match with each other (Step S103).

When the key IDs match with each other (Step S103: Yes), the output controller 104 outputs information representing that the key IDs match with each other (Step S104), and ends the state confirmation processing. When the key IDs do not match with each other (Step S103: No), the output controller 104 outputs information representing that the key IDs do not match with each other (Step S105), and ends the state confirmation processing.

Variation 1

In the above-described embodiment, the attribute information IA is acquired from the communication device 200a. The attribute information IA may be acquired from information obtained by monitoring communication. In Variation 1, the acquisition unit 101 acquires the attribute information IA from a message transmitted and received between the communication device 200a and the communication device 200b. The monitoring of communication refers to processing of collecting (acquiring) messages (e.g., packets) transmitted and received through communication, and analyzing the collected messages. The messages transmitted and received between the communication device 200a and the communication device 200b can be analyzed by making reference to transmission source addresses and destination addresses designated by headers and the like in the collected messages.

In one example, when transmitting data to the communication device 200b, the communication device 200a encrypts the data and puts the encrypted data in a payload of a packet (one example of a message to be transmitted). Then, the communication device 200a puts, to a header of the packet, a key ID of an encryption key used for the encryption as plain text.

The acquisition unit 101 can acquire the key ID as the attribute information IA, which is included in the header of the packet obtained by monitoring communication of the network 501. Note that the communication device 200a may also communicate with communication devices 200 other than the communication device 200b. In such a case, the acquisition unit 101 monitors a packet with a header or the like including identification information about a communication device 200 serving as a communication destination (e.g., device identification information and address) from among the other communication devices 200.

FIG. 6 is a flowchart illustrating one example of state confirmation processing in Variation 1.

The acquisition unit 101 monitors communication between the communication device 200a and the communication device 200b, and acquires a key ID in a packet obtained by the monitoring (Step S201).

Since subsequent processing (Steps S202 to S205) is similar to Steps S102 to S105 in FIG. 5, description thereof is omitted.

Variation 2

The attribute of an encryption key is not limited to a key ID, and may be any other information. In Variation 2, the size of data transmitted and received by using an encryption key is applied as the attribute of the encryption key.

In the present variation, by monitoring communication of the network 501, the acquisition unit 101 calculates the size of data that was transmitted and received after being encrypted with an encryption key in communication between the communication device 200a and the communication device 200b. The calculated size of data is acquired as the attribute information IA.

Moreover, in the present variation, the acquisition unit 102 acquires a remaining amount of encryption keys at each of plural time points from the key management device 300a. Then, the acquisition unit 102 determines a consumption amount of encryption keys on the basis of the acquired remaining amount, and acquires the size corresponding to the consumption amount as the attribute information IB.

In one example of acquiring a consumption amount of encryption keys, the acquisition unit 102 of the communication management device 100 gives an SAE ID of the communication device 200b to the key management device 300a, as device identification information about the communication device 200b. In response, the key management device 300a transmits, to the communication management device 100, the remaining amount of encryption keys used for communication with the communication device 200b. By repeating such a procedure for acquiring the remaining amount, the acquisition unit 102 can calculate the consumption amount of encryption keys in the key management device 300a.

The acquisition unit 102 can calculate the size of transmitted and received data, from the consumption amount of encryption keys. When an encryption method such as the OTP in which the size of an encryption key matches the size of data to be encrypted is used, the acquisition unit 102 can determine a value of the consumption amount as a value of the size of the data. When an encryption method in which the size of an encryption key and the size of data are represented by a specific relation (e.g., relational expression) is used, the acquisition unit 102 can determine the value of the size of the data from the value of the consumption amount in accordance with the specific relation.

Moreover, in present the variation, the determination unit 103 determines whether the size of the data acquired by the acquisition unit 101 matches with the size of the data acquired by the acquisition unit 102.

In a configuration that the size of encrypted data which was transmitted and received is determined as attribute information as in the present variation, the attribute information (size of data) can be used for a function of collecting a fee according to a consumption amount (size of data) of encryption keys.

The state confirmation processing of the present variation may be executed when dummy data is transmitted before desired data (e.g., genome data) is transmitted. Thereby, desired data can be transmitted at the time when the quantum encryption communication is determined as being available.

Note that, in the key management device 300, an encryption key may be newly created. In such a case, the acquisition unit 102 acquires from the key management device 300a not only the remaining amount of encryption keys but also a creation amount of encryption keys (amount of encryption keys newly shared by the key management device 300a with the key management device 300b). The acquisition unit 102 can calculate the consumption amount of encryption keys by calculating a change amount of encryption keys from the remaining amount of encryption keys and subtracting the creation amount from the change amount.

Figure 7:
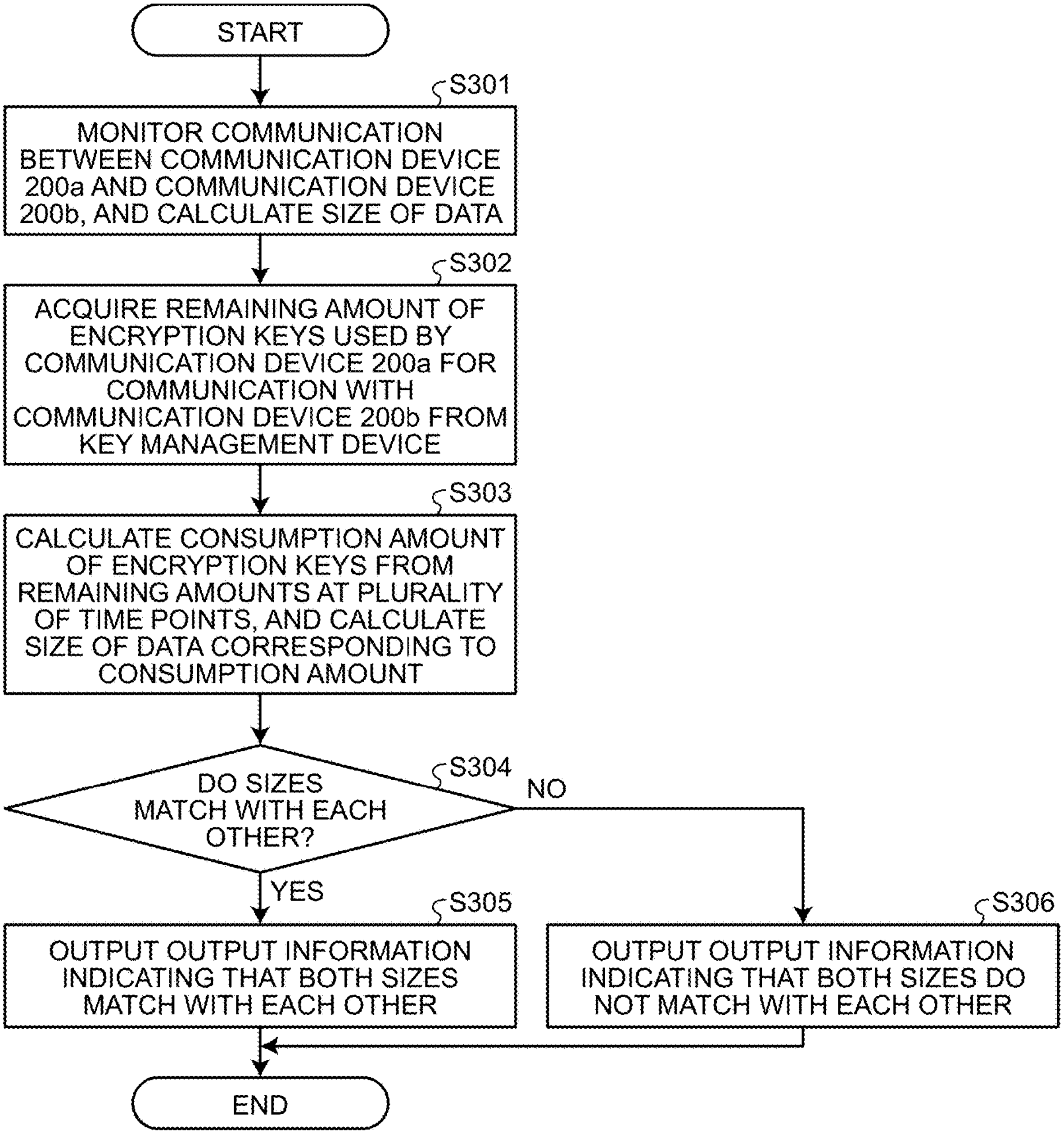
FIG. 7 is a flowchart of state confirmation processing in Variation 2.

FIG. 7 is a flowchart illustrating one example of state confirmation processing in Variation 2.

The acquisition unit 101 monitors communication between the communication device 200a and the communication device 200b, and calculates the size of transmitted and received data encrypted in the communication between the communication device 200a and the communication device 200b (Step S301). The calculated size is acquired as the attribute information IA.

The acquisition unit 102 acquires, from the key management device 300a, a remaining amount of encryption keys used by the communication device 200a for communication with the communication device 200b (Step S302). In one example of acquiring the remaining amount, the acquisition unit 102 of the communication management device 100 gives the device identification information (SAE ID) of the communication device 200*b* to the key management device 300*a*. In response, the key management device 300*a* transmits, to the communication management device 100, the remaining amount of encryption keys to be given to the communication device 200*a* for communication with the communication device 200*b*. This procedure enables the acquisition unit 102 to acquire the remaining amount of encryption keys.

Moreover, the acquisition unit 102 calculates a consumption amount of encryption keys by using the remaining amounts acquired at plural time points (times), and calculates the size of data corresponding to the consumption amount (Step S303). The calculated size is equivalent to the attribute information IB.

The determination unit 103 compares the size (attribute information IA) acquired in Step S301 with the size (attribute information IB) acquired in Step S303, and determines whether those sizes match with each other (Step S304).

When the sizes match with each other (Step S304: Yes), the output controller 104 outputs information representing that the sizes match with each other (Step S305), and ends the state confirmation processing. When the sizes do not match with each other (Step S304: No), the output controller 104 outputs information representing that the sizes do not match with each other (Step S306), and ends the state confirmation processing.

In the present variation, the output controller 104 may output information representing the consumption amount of encryption keys. Such output information can be used for, for example, a function of collecting a fee according to the consumption amount of encryption keys.

Variation 3

In the above-described Variation 2, the remaining amount of encryption keys is acquired from the key management device 300*a*, and the consumption amount of encryption keys is calculated from the acquired remaining amount. In Variation 3, the consumption amount of encryption keys is acquired from the key management device 300*a*.

As in Variation 2, the acquisition unit 101 according to the present variation calculates the size of data transmitted and received after being encrypted in communication between the communication device 200*a* and the communication device 200*b* by monitoring communication of the network 501, and acquires the calculated size as the attribute information IA.

Moreover, in the present variation, the acquisition unit 102 acquires the consumption amount of encryption keys from the key management device 300*a*, and acquires the size corresponding to the acquired consumption amount as the attribute information IB. In one example, the consumption amount is an amount of encryption keys consumed in a predetermined period of time. The predetermined period of time is, for example, a period of time in the past (e.g., 10 seconds).

FIG. 8 is a flowchart illustrating one example of state confirmation processing in Variation 3.

Step S401 is similar to Step S301 in FIG. 7 (Variation 2).

The acquisition unit 102 acquires, from the key management device 300*a*, a consumption amount of encryption keys used by the communication device 200*a* for communication with the communication device 200*b* (Step S402). In one example of a procedure for acquiring the key ID, the acquisition unit 102 of the communication management device 100 gives the device identification information (SAE ID) of the communication device 200*b* to the key management device 300*a*. In response, the key management device 300*a* transmits, to the communication management device 100, the consumption amount of encryption keys (e.g., amount consumed in past ten seconds), which has been given to the communication device 200*a* for communication with the communication device 200*b*. This procedure enables the acquisition unit 102 to acquire the consumption amount of encryption keys.

Moreover, the acquisition unit 102 calculates the size of data corresponding to the acquired consumption amount (Step S403). The calculated size is equivalent to the attribute information IB.

Since subsequent processing (Steps S404 to S406) is similar to Steps S304 to S306 in FIG. 7, description thereof is omitted.

Also in the present variation, as in Variation 2, the output controller 104 may output information representing the consumption amount of encryption keys. Such output information can be used for, for example, a function of collecting a fee according to the consumption amount of encryption keys.

As described above, the information processing systems of the embodiment and the variations include an information processing device (communication management device) that is configured to confirm the state of the quantum encryption communication by using the attribute information about an encryption key. With this configuration, it is possible to confirm the state of the quantum encryption communication using an encryption key shared by means of quantum key distribution (QKD).

Next, a hardware configuration of each device (communication management device 100, communication device 200, and key management device 300) of the embodiment will be described with reference to FIG. 9. FIG. 9 is an explanatory diagram illustrating a hardware configuration example of a device of the embodiment.

Each device according to the embodiment includes: a control device including a CPU 51 (an example of the hardware processor), a storage device including memories such as a read only memory (ROM) 52 and a RAM 53, a communication I/F 54 connected to a network to perform communication, and a bus 61 connecting the elements above.

A computer program to be executed by each device of the embodiment is provided by being stored in advance in the ROM 52 or the like.

The program to be executed by each device of the embodiment may be provided as a computer program product by being recorded on a computer-readable recording medium, such as a compact disk read only memory (CD-ROM), a flexible disk (FD), a compact disk recordable (CD-R), and a digital versatile disk (DVD), in a file in an installable or executable format.

Moreover, the program to be executed by each device of the embodiment may be provided by being installed in a computer connected to a network such as the Internet and downloaded via the network. Moreover, the program to be executed by each device of the embodiment may be provided or distributed via a network such as the Internet.

The program to be executed by each device of the embodiment can cause a computer to function as each unit of the device described above. In the computer, the CPU 51 can read a program from a computer-readable recording medium onto a main storage device, and execute the program.

Configuration examples according to the embodiment will be described below.

Configuration Example 1

An information processing device connected to at least a first communication device out of the first communication device and a second communication device, the first communication device acquiring, from a first key management device, an encryption key shared by quantum key distribution between the first key management device and a second key management device, the encryption key being to be used for communication with the second communication device, the second communication device acquiring the encryption key to be used for communication with the first communication device from the second key management device, the information processing device comprising:

one or more hardware processors connected to memories and configured to acquire first attribute information indicating an attribute of the encryption key to be used for communication between the first communication device and the second communication device, the first attribute information being acquired from the first communication device or from a message transmitted and received in communication between the first communication device and the second communication device, acquire second attribute information indicating an attribute of the encryption key to be used for communication between the first communication device and the second communication device, the second attribute information being acquired on the basis of information acquired from the first key management device, and output information related to the first attribute information and the second attribute information.

Configuration Example 2

The information processing device according to the configuration example 1, wherein the attribute is key identification information by which the encryption key is identified.

Configuration Example 3

The information processing device according to the configuration example 2, wherein the one or more hardware processors are configured to transmit, to the first communication device, device identification information by which the second communication device is identified, and acquire, as the first attribute information, the key identification information transmitted by the first communication device in response to the device identification information.

Configuration Example 4

The information processing device according to the configuration example 2, wherein the one or more hardware processors are configured to acquire, as the first attribute information, the key identification information from the message transmitted and received in communication between the first communication device and the second communication device.

Configuration Example 5

The information processing device according to the configuration example 1, wherein the attribute is a size of data transmitted and received by using the encryption key.

Configuration Example 6

The information processing device according to the configuration example 5, wherein the one or more hardware processors are configured to acquire, from the first key management device, a remaining amount of encryption keys at each of plural time points, determine a consumption amount of encryption keys on the basis of the remaining amount, and acquire the size corresponding to the consumption amount.

Configuration Example 7

The information processing device according to the configuration example 5, the one or more hardware processors are configured to acquire a consumption amount of encryption keys from the first key management device, and acquire the size corresponding to the consumption amount.

Configuration Example 8

The information processing device according to any one of the configuration examples 1 to 7, the one or more hardware processors are configured to determine whether an attribute indicated by the first attribute information matches with an attribute indicated by the second attribute information, and output, as the information to be output, a result of the determination on the attribute.

Configuration Example 9

The information processing device according to any one of the configuration examples 1 to 8, further comprising the first key management device.

Configuration Example 10

An information processing method to be executed by an information processing device connected to at least a first communication device out of the first communication device and a second communication device, the first communication device acquiring, from a first key management device, an encryption key shared by quantum key distribution between the first key management device and a second key management device, the encryption key being to be used for communication with the second communication device, the second communication device acquiring the encryption key to be used for communication with the first communication device from the second key management device, the method comprising:

acquiring first attribute information indicating an attribute of the encryption key to be used for communication between the first communication device and the second communication device, the first attribute information being acquired from the first communication device or from a message transmitted and received in communication between the first communication device and the second communication device;

acquiring second attribute information indicating an attribute of the encryption key to be used for communication between the first communication device and the second communication device, the second attribute information being acquired on the basis of information acquired from the first key management device; and outputting information related to the first attribute information and the second attribute information.

Configuration Example 11

A computer program product comprising a non-transitory computer-readable recording medium on which a program executable by a computer is recorded, the computer being provided in an information processing device connected to at least a first communication device out of the first communication device and a second communication device, the first communication device acquiring, from a first key management device, an encryption key shared by quantum key distribution between the first key management device and a second key management device, the encryption key being to be used for communication with the second communication device, the second communication device acquiring the encryption key to be used for communication with the first communication device from the second key management device, the computer program causing the computer to perform processing, the processing comprising:

acquiring first attribute information indicating an attribute of the encryption key to be used for communication between the first communication device and the second communication device, the first attribute information being acquired from the first communication device or from a message transmitted and received in communication between the first communication device and the second communication device;

acquiring second attribute information indicating an attribute of the encryption key to be used for communication between the first communication device and the second communication device, the second attribute information being acquired on the basis of information acquired from the first key management device; and outputting information related to the first attribute information and the second attribute information.

Configuration Example 12

An information processing system comprising:

an information processing device connected to at least a first communication device out of the first communication device and a second communication device; and a first key management device configured to share an encryption key with a second key management device by quantum key distribution, and output the encryption key to be used for communication between the first communication device and the second communication device to the first communication device, the second communication device acquiring the encryption key to be used for communication with the first communication device from the second key management device, wherein the information processing device includes one or more hardware processors connected to memories and configured to acquire first attribute information indicating an attribute of the encryption key to be used for communication between the first communication device and the second communication device, the first attribute information being acquired from the first communication device or from a message transmitted and received in communication between the first communication device and the second communication device, acquire second attribute information indicating an attribute of the encryption key to be used for communication between the first communication device and the second communication device, the second attribute information being acquired on the basis of information acquired from the first key management device, and output information related to the first attribute information and the second attribute information.

While certain embodiments have been described, these embodiments have been presented by way of example only, and are not intended to limit the scope of the disclosures. Indeed, the novel embodiments described herein may be embodied in a variety of other forms; moreover, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An information processing device connected to at least a first communication device out of the first communication device and a second communication device, the first communication device acquiring, from a first key management device, an encryption key shared by quantum key distribution between the first key management device and a second key management device, the encryption key being to be used for communication with the second communication device, the second communication device acquiring the encryption key to be used for communication with the first communication device from the second key management device, the information processing device comprising:

one or more hardware processors configured to:

acquire first attribute information indicating an attribute of the encryption key to be used for communication between the first communication device and the second communication device, the first attribute information being acquired from the first communication device or from a message transmitted and received in communication between the first communication device and the second communication device, acquire second attribute information indicating an attribute of the encryption key to be used for communication between the first communication device and the second communication device, the second attribute information being acquired on the basis of information acquired from the first key management device, and output information related to the first attribute information and the second attribute information so that the information is used by a device of an output destination to confirm a state of the quantum encryption, wherein at least one of first attribute of the encryption key or the second attribute of the encryption key is a size of data transmitted and received by using the encryption key.

2. The information processing device according to claim 1, wherein the one or more hardware processors are configured to acquire, from the first key management device, a remaining amount of encryption keys at each of plural time points, determine a consumption amount of encryption keys on the basis of the remaining amount, and acquire the size corresponding to the consumption amount.

3. The information processing device according to claim 1, the one or more hardware processors are configured to acquire a consumption amount of encryption keys from the first key management device, and acquire the size corresponding to the consumption amount.

4. The information processing device according to claim 1, the one or more hardware processors are configured to determine whether an attribute indicated by the first attribute information matches with an attribute indicated by the second attribute information, and output, as the information to be output, a result of the determination on the attribute.

5. The information processing device according to claim 1, further comprising the first key management device.

6. The information processing device according to claim 1, wherein the one or more hardware processors are configured to:

if an encryption method in which a size of an encryption key matches a size of data to be encrypted is used, determine a value of a consumption amount of one or more encryption keys as the size of the data.

7. The information processing device according to claim 1, wherein the one or more hardware processors are configured to:

if an encryption method in which a size of an encryption key and a size of data to be encrypted are represented by a specific relation is used, determine the size of the data from a consumption amount of one or more encryption keys in accordance with the specific relation.

8. The information processing device according to claim 1, wherein the one or more hardware processors are configured to:

output the information that includes both of the first attribute information and the second attribute information.

9. An information processing method to be executed by an information processing device connected to at least a first communication device out of the first communication device and a second communication device, the first communication device acquiring, from a first key management device, an encryption key shared by quantum key distribution between the first key management device and a second key management device, the encryption key being to be used for communication with the second communication device, the second communication device acquiring the encryption key to be used for communication with the first communication device from the second key management device, the method comprising:

acquiring first attribute information indicating an attribute of the encryption key to be used for communication between the first communication device and the second communication device, the first attribute information being acquired from the first communication device or from a message transmitted and received in communication between the first communication device and the second communication device;

acquiring second attribute information indicating an attribute of the encryption key to be used for communication between the first communication device and the second communication device, the second attribute information being acquired on the basis of information acquired from the first key management device; and outputting information related to the first attribute information and the second attribute information so that the information is used by a device of an output destination to confirm a state of the quantum encryption, wherein at least one of first attribute of the encryption key or the second attribute of the encryption key is a size of data transmitted and received by using the encryption key.

10. The information processing method according to claim 9, wherein the method further comprising:

if an encryption method in which a size of an encryption key matches a size of data to be encrypted is used, determining a value of a consumption amount of one or more encryption keys as the size of the data.

11. The information processing method according to claim 9, wherein the method further comprising:

if an encryption method in which a size of an encryption key and a size of data to be encrypted are represented by a specific relation is used, determining the size of the data from a consumption amount of one or more encryption keys in accordance with the specific relation.

12. The information processing method according to claim 9, wherein the method further comprising:

outputting the information that includes both of the first attribute information and the second attribute information.

13. A computer program product comprising a non-transitory computer-readable recording medium on which a program executable by a computer is recorded, the computer being provided in an information processing device connected to at least a first communication device out of the first communication device and a second communication device, the first communication device acquiring, from a first key management device, an encryption key shared by quantum key distribution between the first key management device and a second key management device, the encryption key being to be used for communication with the second communication device, the second communication device acquiring the encryption key to be used for communication with the first communication device from the second key management device, the computer program causing the computer to perform processing, the program instructing the computer to:

acquire first attribute information indicating an attribute of the encryption key to be used for communication between the first communication device and the second communication device, the first attribute information being acquired from the first communication device or from a message transmitted and received in communication between the first communication device and the second communication device;

acquire second attribute information indicating an attribute of the encryption key to be used for communication between the first communication device and the second communication device, the second attribute information being acquired on the basis of information acquired from the first key management device; and output information related to the first attribute information and the second attribute information so that the information is used by a device of an output destination to confirm a state of the quantum encryption, wherein at least one of first attribute of the encryption key or the second attribute of the encryption key is a size of data transmitted and received by using the encryption key.

14. The computer program product according to claim 13, wherein the program further instructing the computer to:

if an encryption method in which a size of an encryption key matches a size of data to be encrypted is used, determine a value of a consumption amount of one or more encryption keys as the size of the data.

15. The computer program product according to claim 13, wherein the program further instructing the computer to:

if an encryption method in which a size of an encryption key and a size of data to be encrypted are represented by a specific relation is used, determine the size of the data from a consumption amount of one or more encryption keys in accordance with the specific relation.

16. The computer program product according to claim 13, wherein the program further instructing the computer to:

output the information that includes both of the first attribute information and the second attribute information.

17. An information processing system comprising:

an information processing device connected to at least a first communication device out of the first communication device and a second communication device; and a first key management device configured to:

share an encryption key with a second key management device by quantum key distribution, and output the encryption key to be used for communication between the first communication device and the second communication device to the first communication device, the second communication device acquiring the encryption key to be used for communication with the first communication device from the second key management device, wherein the information processing device includes one or more hardware processors configured to:

acquire first attribute information indicating an attribute of the encryption key to be used for communication between the first communication device and the second communication device, the first attribute information being acquired from the first communication device or from a message transmitted and received in communication between the first communication device and the second communication device, acquire second attribute information indicating an attribute of the encryption key to be used for communication between the first communication device and the second communication device, the second attribute information being acquired on the basis of information acquired from the first key management device, and output information related to the first attribute information and the second attribute information so that the information is used by a device of an output destination to confirm a state of the quantum encryption; and at least one of first attribute of the encryption key or the second attribute of the encryption key is a size of data transmitted and received by using the encryption key.

18. The information processing system according to claim 17, wherein the one or more hardware processors are configured to:

if an encryption method in which a size of an encryption key matches a size of data to be encrypted is used, determine a value of a consumption amount of one or more encryption keys as the size of the data.

19. The information processing system according to claim 17, wherein the one or more hardware processors are configured to:

if an encryption method in which a size of an encryption key and a size of data to be encrypted are represented by a specific relation is used, determine the size of the data from a consumption amount of one or more encryption keys in accordance with the specific relation.

20. The information processing system according to claim 17, wherein the one or more hardware processors are configured to:

output the information that includes both of the first attribute information and the second attribute information.

* * * * *